C. WILLERSDORF.
AUTOMATIC GUARD CONTROL FOR DOUGH MIXERS.
APPLICATION FILED JULY 16, 1915.
1,197,321.
Patented Sept. 5, 1916.
2 SHEETS—SHEET 1.
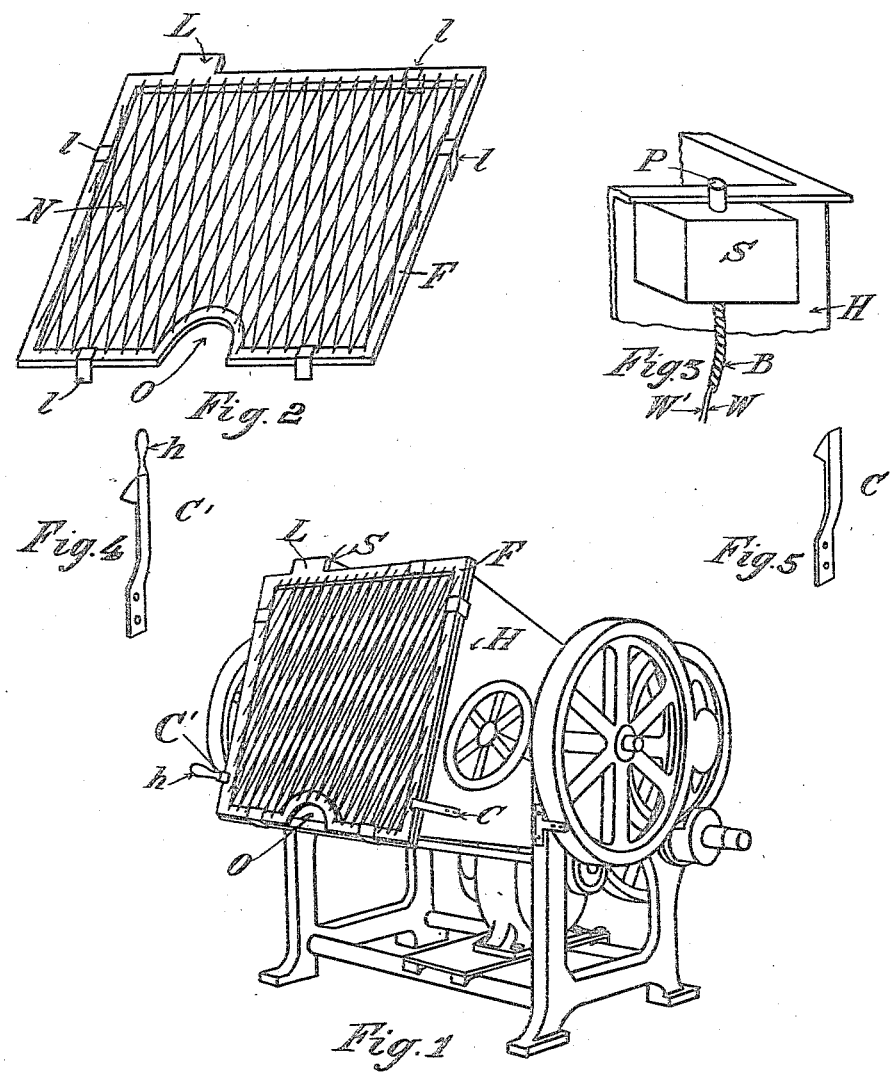

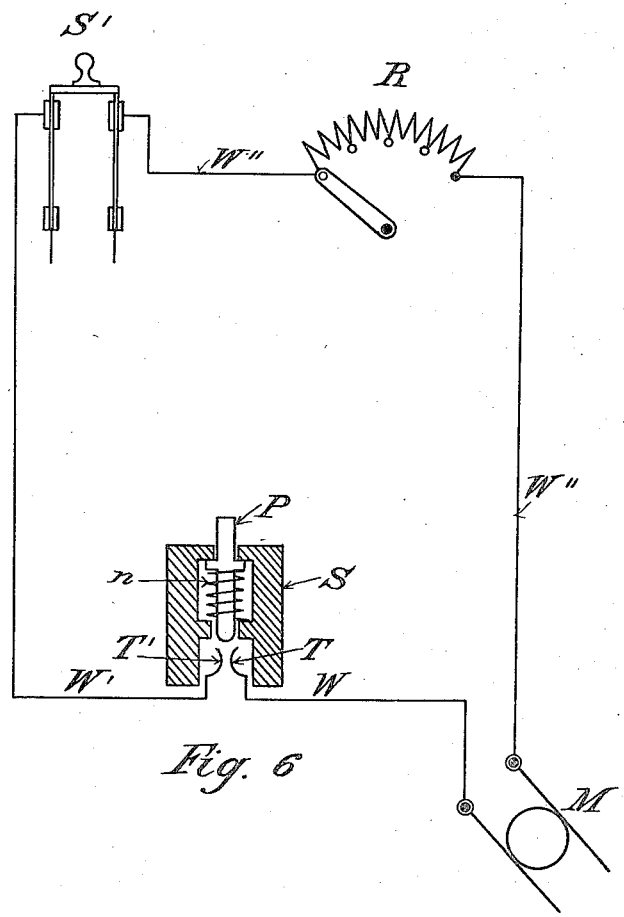

UNITED STATES PATENT OFFICE.

CHARLES WILLERSDORF, OF PATERSON, NEW JERSEY.

AUTOMATIC GUARD CONTROL FOR DOUGH-MIXERS.

1,197,321.        Specification of Letters Patent.     Patented Sept. 5, 1916.

Application filed July 16, 1915. Serial No. 40,242.

*To all whom it may concern:*

Be it known that I, CHARLES WILLERSDORF, a citizen of the United States, residing at 329 Main street, in the city of Paterson, in the county of Passaic and State of New Jersey, have invented certain new and useful Improvements in Automatic Guard Control for Dough-Mixers, of which the following is a specification, reference being had therein to the accompanying drawing.

My invention relates to improvements in dough mixing machines in which the batter is beaten or mixed by means of rotating knives or beaters in a tilting or other hopper and is particularly applied to electrically driven dough-mixing devices; and the objects of my improvements are, first, to provide a hopper with a perforated cover; second, to provide a hopper with electric connections for driving the dough-mixing devices contained therein and with a perforated cover; and, third, to provide an electrically driven dough-mixing device having a tilting hopper, perforated cover therefor, and electrical connections adapted to become engaged with and disengaged from the cover for the purpose of starting and stopping the operation of the dough-mixing device upon the placing and removal respectively of the perforated cover. I attain these objects by the mechanism illustrated in the accompanying drawings, in which similar letters refer to similar parts throughout the several views.

In the drawings, Figure 1 is a view showing a tilted motor-driven dough-mixing machine with guard-control cover in place; Fig. 2 shows a view of the guard control cover detached; Fig. 3 shows the plug-switch in place and a fragment of the hopper; Figs. 4 and 5 show the spring catches used to hold the guard-control-cover in place, and Fig. 6 is a diagrammatic view of the electrical connections and a sectional view of the plug switch.

The guard-control-cover shown in Fig. 2 consists of a frame F supporting the wire netting N. On the lower edge of this frame a somewhat semi-circular opening O is provided to serve as a hand-hole for the operator, to facilitate the examination of the dough while the machine is in use. The frame is provided with the lugs —1— to keep the cover in proper alinement on the hopper H. The plug-switch S is fixed to the hopper H so that the ledge or projecting portion L on the frame F will engage and depress the pin P. The catches C and C′ serve to secure the guard-control-cover to the hopper H and the handle —h— on the catch C′ facilitates the removal or application of the cover. When the cover is in place, the pin P is depressed by the projecting ledge L connecting the terminal T and T′ of the wires W and W′, affording unbroken connection between the switch S′ and the motor M, so that the machine may be started in the usual manner by the switch S′ and the rheostat R. Should the cover be removed from the hopper, the pin P is forced back by the spring —n—, breaking the circuit at the terminals T and T′ of the wires W and W′, causing the machine to stop. This interruption of current will allow the rheostat R to return to open circuit position, so that should the guard-control cover be replaced and connection restored at T and T′ the machine will not operate until the rheostat R is again advanced. By inclosing the wires W and W′ in the cable B, which is made long enough to hang loosely over the back of the hopper H, the hopper can be inclined or tilted to any desired angle without interfering with the proper working of the attachment.

In a motor driven machine my perforated guard cover is a safe-guard against injury, and it also serves as a control, the application of the cover to the hopper starting the machine and the removal of the cover stopping the machine through the electrical connections above described, or other suitable electrical connections which may be substituted, without departing from the spirit or scope of my invention.

With this description of my invention, what I claim is:—

1. In a dough-mixing machine, the combination with the tilting hopper thereof, of a flange around the mouth of the same, an electric motor to drive the mixing means in said hopper, an electric switch secured to said hopper immediately beneath said flange and comprising an upwardly projecting spring-pressed member, a flexible cable connecting said switch to the circuit of said motor, and a removable cover adapted to be secured to said flange and to depress said switch member, thereby closing the circuit and starting the motor.

2. In a machine of the class described, the combination with the mixing hopper, of an electric motor for driving the same, the power circuit of such motor, a switch for closing said circuit, said switch being carried on said hopper, a spring to normally hold said switch open, a removable cover for said hopper, catches, to hold said cover in place, and means on said cover to depress said switch and close the circuit when the cover is in place.

In testimony whereof I affix my signature in presence of two witnesses.

CHARLES WILLERSDORF.

Witnesses:
BESSIE BERLINER,
ALIDA S. SHERMAN.